(12) United States Patent
Kallevig et al.

(10) Patent No.: US 10,150,502 B2
(45) Date of Patent: Dec. 11, 2018

(54) LINKAGE ADJUSTMENT SYSTEM AND VEHICLE INCORPORATING SAME

(71) Applicant: THE TORO COMPANY, Bloomington, MN (US)

(72) Inventors: Jeffrey B. Kallevig, Spicer, MN (US); Merle W. Gaedy, Roseville, MN (US); Phat T. Nghiem, Minnetonka, MN (US); Ryan J. Volovsek, Inver Grove Heights, MN (US); Timothy J. Clift, Lino Lakes, MN (US)

(73) Assignee: THE TORO COMPANY, Bloomington, MN (US)

( * ) Notice: Subject to any disclaimer, the term of this patent is extended or adjusted under 35 U.S.C. 154(b) by 472 days.

(21) Appl. No.: 14/855,785

(22) Filed: Sep. 16, 2015

(65) Prior Publication Data

US 2016/0083009 A1    Mar. 24, 2016

Related U.S. Application Data

(60) Provisional application No. 62/052,621, filed on Sep. 19, 2014.

(51) Int. Cl.
*B62D 11/00* (2006.01)
(52) U.S. Cl.
CPC .................................. *B62D 11/006* (2013.01)
(58) Field of Classification Search
CPC .................................................... B62D 11/18
See application file for complete search history.

(56) References Cited

U.S. PATENT DOCUMENTS

| 4,558,558 | A | 12/1985 | Horner, Jr. et al. |
| 5,131,483 | A | 7/1992 | Parkes |
| 5,511,367 | A | 4/1996 | Powers et al. |
| 5,822,961 | A | 10/1998 | Busboom |
| 5,848,520 | A | 12/1998 | Arfstrom et al. |
| 6,098,385 | A | 8/2000 | Turk |
| 6,105,348 | A | 8/2000 | Turk et al. |
| 6,155,033 | A | 12/2000 | Wians et al. |
| 6,301,864 | B1 | 10/2001 | Damie et al. |
| 6,557,331 | B2 | 5/2003 | Busboom et al. |

(Continued)

FOREIGN PATENT DOCUMENTS

WO    WO 2010/030283 A1    3/2010

OTHER PUBLICATIONS

U.S. Appl. No. 62/052,621, filed Sep. 19, 2014, Kallevig et al.

(Continued)

*Primary Examiner* — Terence Boes
(74) *Attorney, Agent, or Firm* — Mueting, Raasch & Gebhardt, P.A.

(57) ABSTRACT

A linkage adjustment system adapted to adjust a linkage, and a vehicle incorporating the same. In one embodiment, the linkage adjustment system adjusts a linkage operatively connecting an input (e.g., operator control lever of a lawn mower) to an output (e.g., drive system of a first drive wheel associated with a first (e.g., left) side of the mower). An adjustment device may adjust the linkage so that the first drive wheel rotates at the same speed as a second drive wheel (e.g., on the right side of the mower) when the control levers associated with both drive wheels are in a maximum forward position. A range setting arm of the system may adjust the total output of the first drive wheel (total forward and reverse output) to match the total output of the second drive wheel.

12 Claims, 12 Drawing Sheets

(56) References Cited

U.S. PATENT DOCUMENTS

| | | | |
|---|---|---|---|
| 6,640,526 B2 | 11/2003 | Velke et al. |
| 6,668,529 B2 | 12/2003 | Busboom et al. |
| 6,688,090 B2 | 2/2004 | Velke et al. |
| 6,729,115 B2 | 5/2004 | Bartel |
| 6,739,116 B2 | 5/2004 | Stover et al. |
| 6,782,964 B1 | 8/2004 | Korthals et al. |
| 6,912,831 B2 | 7/2005 | Velke et al. |
| 6,935,106 B2 | 8/2005 | Korthals |
| 6,951,092 B2 | 10/2005 | Busboom et al. |
| 6,968,687 B1 | 11/2005 | Poplawski et al. |
| 7,213,662 B2 | 5/2007 | Crumly |
| 7,325,388 B2 | 2/2008 | Wright et al. |
| 7,458,588 B2 | 12/2008 | Kallevig |
| 7,607,283 B2 | 10/2009 | Wright et al. |
| 7,647,754 B2 | 1/2010 | Velke et al. |
| 7,857,089 B1 | 12/2010 | Sugden et al. |
| 8,047,310 B2 | 11/2011 | Kallevig |
| 8,096,374 B1 | 1/2012 | Papke et al. |
| 8,104,552 B2 | 1/2012 | Papke et al. |
| 8,783,391 B2 | 7/2014 | Porter et al. |
| 9,288,939 B2 | 3/2016 | Porter et al. |
| 2001/0001170 A1 | 5/2001 | Velke et al. |
| 2008/0035394 A1 | 2/2008 | Bartel |
| 2010/0126792 A1 | 5/2010 | Kallevig |
| 2011/0192158 A1 | 8/2011 | Simon |
| 2013/0074464 A1 | 3/2013 | Gindt et al. |
| 2013/0074466 A1 | 3/2013 | Zwieg et al. |
| 2013/0074467 A1 | 3/2013 | Zwieg et al. |

OTHER PUBLICATIONS

"Stand-on Mowers // Gravely Pro-Stance," Product Sheet. Ariens Company. Mar. 2012; 3 pages.

"Adjusting Tracking" section from Operator's Manual from John Deere manual OMM154566, Issue D7 [online]. John Deere & Company, [retrieved on Nov. 26, 2013]. Retrieved from the Internet: <URL:http://manuals.deere.com/cceomview/OMM154566_D7/Output/Index.html?tM=HO>; 1 page.

"Peaucellier-Lipkin linkage," *Wikipedia*, [online]. [Retrieved on Sep. 24, 2010]. Retrieved from the Internet: <URL:http://en.wikipedia.org/wiki/Peaucellier-Lipkin_linkage>, 3 pgs.

Preissuance Third-Party Submission Under 37 CFR 1.290; Received by the U.S. Patent Office dated Oct. 15, 2012; U.S. Appl. No. 12/882,610.

"The Toro Company History," brochure (part of Oct. 15, 2012 Preissuance Submission in U.S. Appl. No. 12/822,610). The Toro Company, 2012, 7 pages.

"GrandStand® Mower With 52in Turbo Force Cutting Unit," Parts Catalog, Form No. 3360-897 Rev. C, Model No. 74569-290000001 (part of Oct. 15, 2012 Preissuance Submission in U.S. Appl. No. 12/822,610). The Toro Company, 2009, 44 pages.

"Stander® ZK Commercial Mower Owner's Manual—For Stander ZK Serial # 43106 and higher until superseded," Wright Manufacturing, Inc., May 2008, 20 pgs.

"Stander® ZK Commercial Mower Owner's Manual—For Stander ZK Serial # 46090 and higher until superseded," Wright Manufacturing, Inc., Oct. 2008, 20 pgs.

LINKAGE ADJUSTMENT SYSTEM AND VEHICLE INCORPORATING SAME

This application claims the benefit of U.S. Provisional Application No. 62/052,621, filed Sep. 19, 2014, which is incorporated herein by reference in its entirety.

Embodiments relate generally to vehicular linkage systems, and, for example, to an adjustment system for use with the same.

BACKGROUND

Linkages are used in a wide variety of applications. For example, vehicles such as lawn mowers may include linkages adapted to manipulate specific components of the mower. Such mowers may be configured as either walk-behind or ride-on (stand-on or sit-on) units. For ride-on and larger walk-behind mowers, zero-turning-radius (ZTR) functionality is often provided.

A ZTR mower generally includes a prime mover (e.g., internal combustion engine or electric motor) coupled to a continuously variable (e.g., hydraulic) transmission drive system. The drive system may include left and right hydraulic motors coupled to left and right drive wheels, respectively. Power may be transmitted from the prime mover to the left and right hydraulic motors, e.g., via one or more pumps, to drive the left and right drive wheels independently. The rotational speed and direction of each drive wheel may then be controlled by an associated drive control lever under the control of an operator.

Each drive control lever may typically be positioned at any location between a neutral and a full forward (or a full reverse) position to proportionally alter the speed of the associated drive wheel. A stop may define the full forward position of each control lever (while a second stop may define the full reverse position), and both levers are typically biased to the neutral position.

During mower operation, the operator may seek to place the control levers in the full forward position as this position allows resting of the levers against the stop. This may offer the operator increased comfort, as well as reduce inadvertent lever movement as a result of, for example, traversal of undulating terrain. However, due to variability and tolerances in the manufacture and assembly of mower components (e.g., slight differences in the efficiency of the hydraulic pumps and motors, variations in the lengths of linkage components, variations in tire pressure, etc.), it is not uncommon for one wheel to track faster than the other when both drive control levers are in the full forward position.

To address this issue, the linkages connecting the levers to the drive transmissions may be adjusted. While effective in equalizing the maximum forward speed of each drive wheel, this adjustment may shift one of the levers such that its neutral position is slightly offset (e.g., at a more forward location) from that of the other lever. As a result, when both levers are then moved to the full reverse position, one lever may actually travel farther than the other, resulting in the associated drive wheel rotating faster (in reverse) than the other drive wheel.

SUMMARY

In one embodiment, a linkage adjustment system is provided that includes: a link having a first end and a second end; a first connection mechanism connecting the first end of the link to either an output device or an input device; and a second connection mechanism connecting the second end of the link to the other of the output device or the input device. The second connection mechanism includes a range setting arm coupled to both the link and to the other of the output device or the input device, the arm adapted to receive the second end of the link at one of three or more locations each spaced differently from a pivot axis about which the other of the output device or the input device pivots. Either the second end of the link or the arm includes a locking member adapted to secure the second end to the arm at any one of the three or more locations.

In another embodiment, a linkage adjustment system is provided that includes: a link having a first end and a second end; a transmission attached to a frame; a control lever pivotally attached to the frame and pivotable about a lever pivot axis; a first connection mechanism connecting the first end of the link to the transmission; and a second connection mechanism connecting the second end of the link to the control lever. The second connection mechanism includes a range setting arm having a first portion connected to the second end of the link, and a second portion connected to the control lever. A locking member is also provided. The locking member engages the second end of the link and secures the second end of the link to the arm at any one of an infinite number of locations that are each at a different distance from the lever pivot axis.

In yet another embodiment, a method is provided for adjusting an output range of a linkage system. The method includes attaching a first end of a link to a transmission, and attaching a second end of the link to an arm connected to a control lever, wherein the control lever displaces the link as the control lever and the arm pivot together about a lever pivot axis. The method further includes: adjusting a length of the link to set a maximum forward output of the transmission; attaching an adjustment tool to the arm and to the second end of the link, wherein the adjustment tool has a stationary portion and a moving portion; moving the moving portion relative to the stationary portion, thereby displacing the second end of the link relative to the arm; securing the second end of the link relative to the arm; and removing the adjustment tool from the arm and the second end of the link The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 3A-3C are side elevation views of the linkage adjustment system and an associated input (e.g., operator control lever), wherein: FIG. 3A illustrates the control lever in a first or neutral position; FIG. 3B illustrates the control lever in a second or full forward position; and FIG. 3C illustrates the control lever in a third or full reverse position;

Figure 1:
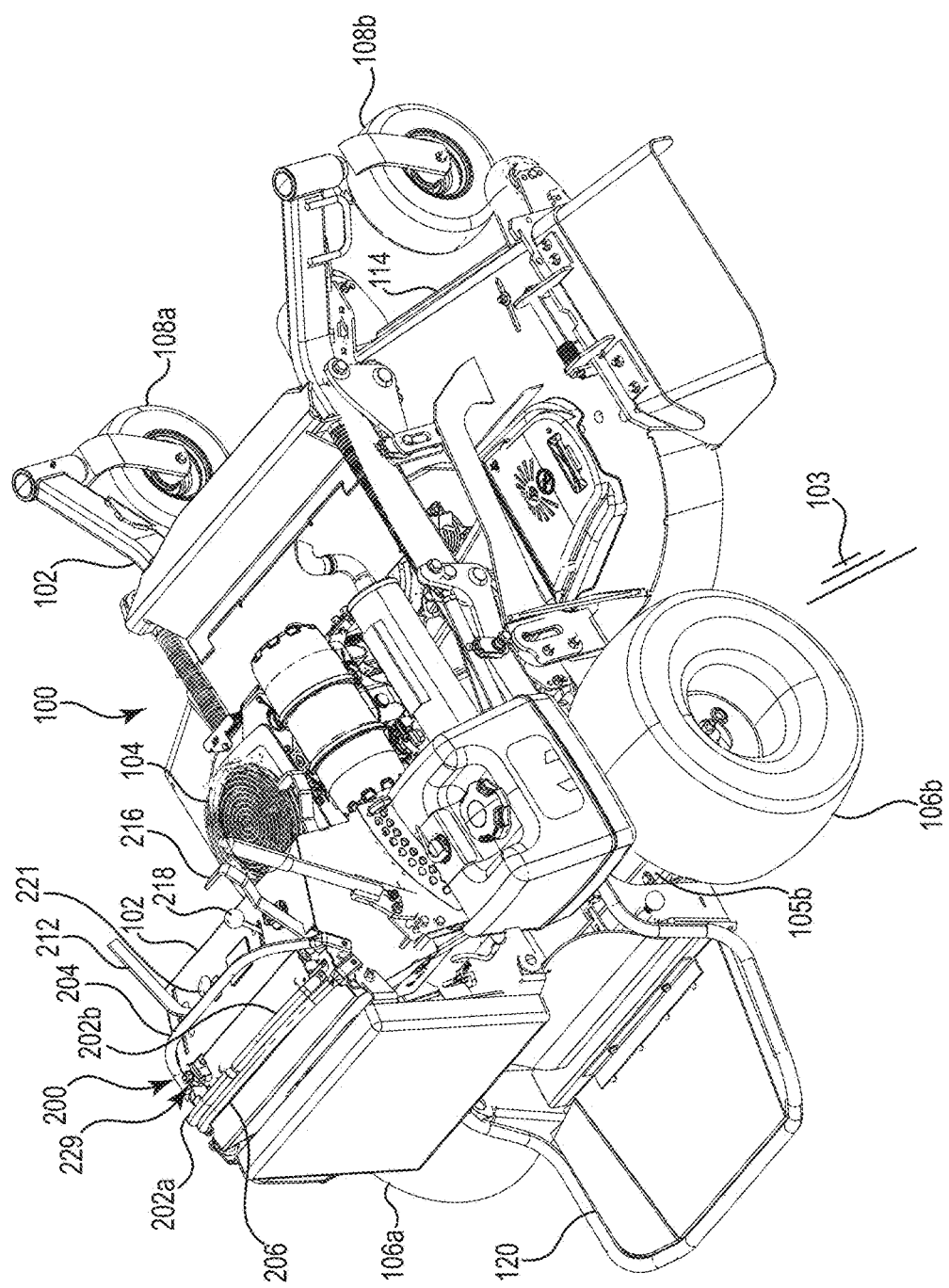
FIG. 1 is a right rear perspective view of a vehicle, e.g., grounds maintenance vehicle such as a stand-on/walk-behind power lawn mower, incorporating a linkage and a linkage adjustment system in accordance with one embodiment.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments not specifically described/illustrated herein are also contemplated.

All headings provided herein are for the convenience of the reader and should not be used to limit the meaning of any text that follows the heading, unless so specified. Moreover, unless otherwise indicated, all numbers expressing quantities in the specification and claims are understood as being modified in all instances by the term "about." Thus, unless otherwise indicated, numerical parameters set forth in the specification and claims are approximations that may vary depending upon the desired properties sought to be obtained.

Illustrative embodiments are shown in the context of a self-propelled vehicle incorporating a prime mover (e.g., internal combustion engine or electric motor). A linkage adjustment system and method may be included and adapted to adjust a linkage connecting an input device (e.g., control lever) with an output device (e.g., transmission). While linkage adjustment systems and methods like those described and illustrated herein may find application to most any linkage, they will be described herein in the context of a linkage connecting an operator control lever (e.g., an input) to a transmission or drive system (e.g., an output) of the vehicle.

FIG. 1 (partially) shows a control system 200 in accordance with one embodiment as it may be incorporated on a self-propelled grounds maintenance vehicle, e.g., a mid-size, walk-behind or ride-on (stand-on) power lawn mower 100.

While, for the sake of brevity, embodiments are herein described with respect to a mid-size lawn mower (hereinafter generically referred to merely as a "mower" or "vehicle"), those of skill in the art will realize that various embodiments of the linkage and linkage adjustment system are equally applicable to other types of walk-behind, ride-behind (e.g., such as those utilizing sulkies), and ride-on mowers as well as to most any other walk-behind, ride-behind, or ride-on self-propelled, vehicle, e.g., skid-steer loader, aerator, snow thrower, tiller, trencher, horizontal directional drill, construction crawler, dozer/loader, agricultural tractor/vehicle, etc. In fact, linkage adjustment systems like those described and/or illustrated herein may find application to most any linkage system, especially those that would benefit from synchronizing two or more outputs (e.g., drive systems) based upon separate and independent inputs.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 2:
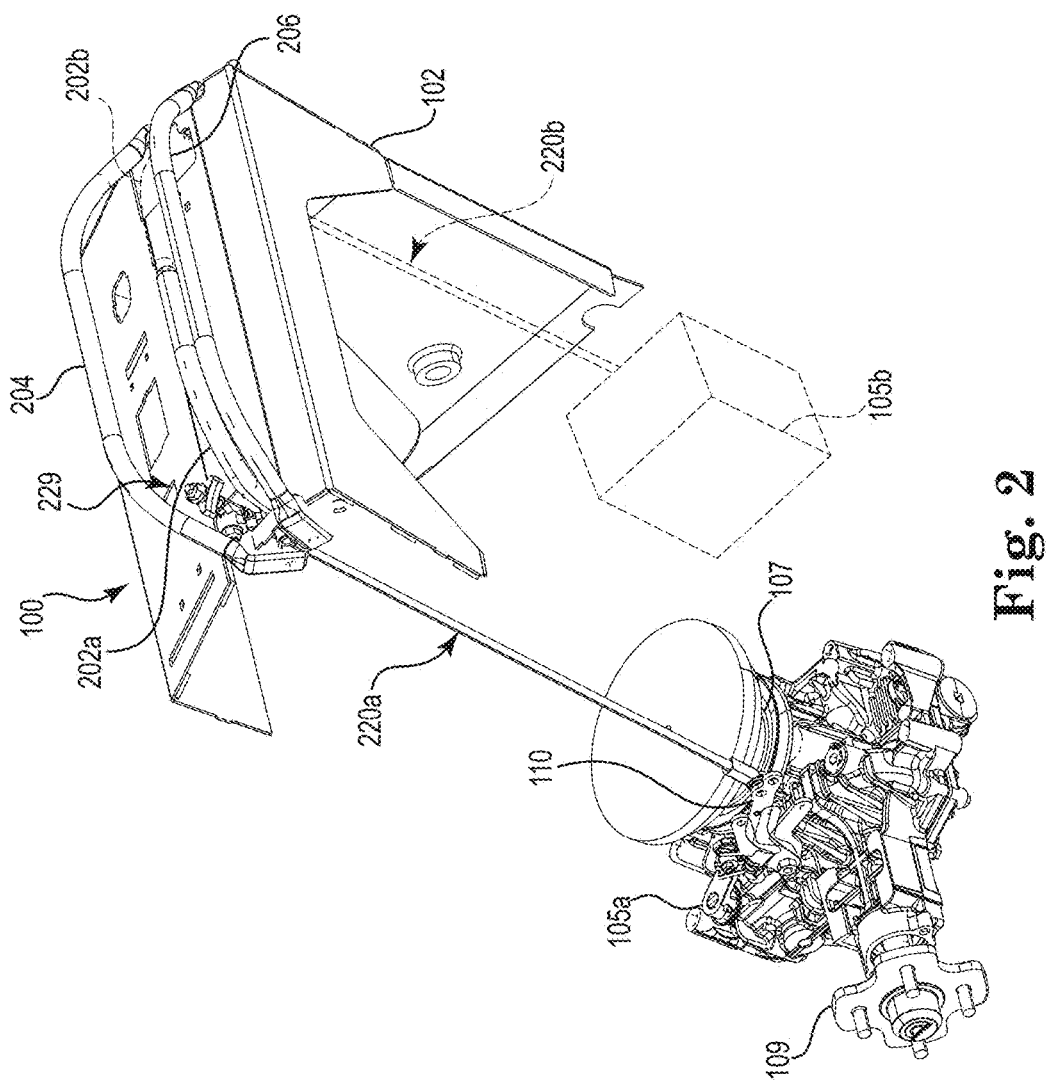
FIG. 2 is a partial left rear perspective view of the mower of FIG. 1 with some structure removed to better illustrate the exemplary linkage and linkage adjustment system.

While the general construction of the exemplary mower 100 is not necessarily central to an understanding of embodiments of the linkage and linkage adjustment system, it will now be briefly described. Again, FIG. 1 illustrates the exemplary mower 100 having a frame 102 supporting a prime mover, e.g., internal combustion engine 104. A pair of transversely opposing, ground engaging drive members (e.g., first and second drive wheels 106 (106a and 106b)) may be coupled for rotation, respectively, to the left and right sides of the frame to support and propel the mower 100 relative to the ground surface 103. A transmission attached to the frame may be adapted to power one or both of the first and second drive members. In the illustrated embodiment, each drive wheel 106 may be powered by its own transmission attached to the frame, e.g., its own hydrostatic motor and pump or, as shown in FIG. 2, by its own integrated hydrostatic transaxle (IHT) 105 (one (e.g., left side 105a) transaxle is fully depicted in FIG. 2, while the other transaxle (e.g., right side 105b) is shown schematically). Each transaxle 105 may be attached to the frame 102 (not shown in FIG. 2) and be powered by the engine 104, e.g., via a belt (not shown) engaged with an input sheave 107 on each transaxle. While not illustrated, other transmissions, e.g., mechanical gear- or pulley-driven systems, are also possible.

Each transaxle 105 may include an axle that drives a hub 109 to which the respective wheel 106 (See FIG. 1) may attach. Operator controls, as further described below, permit independent control of the speed and direction of each drive wheel 106, allowing control of mower 100 speed and direction from a walking or riding (e.g., standing) position. A pair of front caster wheels 108 (see 108a and 108b in FIG. 1), which may be connected to forwardly extending rails of the frame 102, may support the front of the mower 100 in rolling engagement with the ground surface 103.

Although the illustrated mower has the drive wheels 106 in the rear and caster wheels 108 in front, this configuration is not limiting. For example, other embodiments may reverse the location of the wheels, e.g., drive wheels in front and driven or undriven wheels in back, while other embodiments may replace the wheels with other drive members such as tracks. Moreover, other configurations may use different wheel configurations altogether, e.g., a tri-wheel configuration or a vehicle using conventionally steered (e.g., Ackermann-type) front wheels. Accordingly, most any multi-wheel, -track, or other multi-output (e.g., dual propeller) configuration is contemplated.

A cutting deck 114 may be mounted to a lower side of the frame 102 generally between the drive wheels 106 and the caster wheels 108 as indicated in FIG. 1. The cutting deck 114 may include one or more cutting blades (not shown) as known in the art. The cutting blades may be operatively powered, via spindles connected to the deck, by the engine 104. During operation, power is selectively delivered to the cutting deck 114, whereby the blades rotate at a speed sufficient to sever grass and other vegetation over which the cutting deck passes.

The exemplary mower 100 may further include a standing platform 120 that may be moved between a deployed position as shown in FIG. 1, and a stowed position (not shown, but folded against the mower 100 like that shown in, e.g., FIG. 2 of U.S. Pat. No. 8,047,310, which is incorporated herein by reference in its entirety). In the deployed position, an operator may stand upon the platform during vehicle operation. Alternatively, the platform may be moved to the stowed position to accommodate the operator in a walk-behind configuration.

As illustrated in FIG. 1, the mower 100 may further include the operator control system 200. The control system 200 may include operator controls that are mounted to upwardly extending portions of the frame 102 near the rear end of the mower such that the controls are located within comfortable reach of an operator standing either behind the mower or upon the platform 120.

The control system may include, among other elements, a first input (e.g., first operator-controlled lever 202a) and a second input (e.g., second operator-controlled lever 202b). The operator-controlled levers 202 may be referred to herein merely as "control levers" or "steering levers." The control levers 202 may be configured to pivot about a transverse, horizontal axis 231 (see FIG. 4) between a first or forward stop 204, and a second or rearward stop 206 (levers 202 are shown against the rearward stop 206 in both FIGS. 1 and 2). While illustrated as being fixed relative to the frame 102, one or both stops 204 and 206 could alternatively be adjustable (e.g., pivotable). In yet other embodiments, the stops 204 and 206 may be entirely optional (i.e., they may be absent altogether from the mower 100). While not illustrated, one or both of the control levers 202 (e.g., 202b shown in FIG. 1) may also be biased for pivotal, outward movement (e.g., about an axis generally parallel to a longitudinal axis of the mower 100). Such a configuration may permit, upon pivotal inward movement of the control lever 202 by the operator to the position shown in FIG. 1, activation of an operator presence switch (not shown). As is recognized in the art, activation of the presence switch may be required before engaging some of the mower subsystems.

FIG. 2 is a partial view of the mower 100, including exemplary linkage systems 220a and 220b and a linkage adjustment system 229, embodiments of the latter being described in more detail below. In this figure, some mower structure is removed for clarity. As will become clear, in one embodiment, a linkage adjustment system 229 is provided for only one of the linkage systems (e.g., the left side linkage system 220a).

Figure 3C:
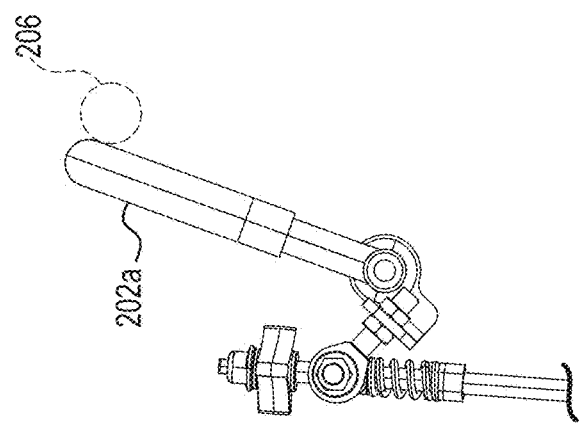
Figure 3B:
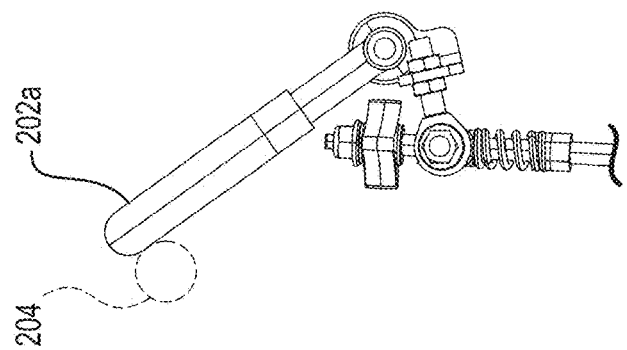
Figure 3A:
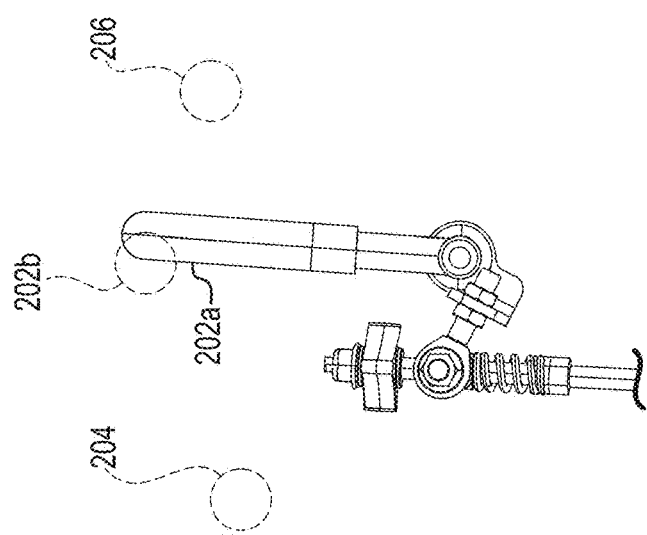

While the control lever(s) 202 are shown in the full reverse position in FIGS. 1 and 2, each control lever 202 may be biased to a first or neutral position between the two stops 204 and 206 as shown in FIG. 3A. This neutral position may correspond to zero output (velocity) of the lever's associated IHT 105 and drive wheel 106. Each control lever 202 (e.g., lever 202a) may further be pivotable forwardly to a second, maximum output (maximum forward) position (e.g., abutting the first forward stop 204) as shown in FIG. 3B, corresponding to a maximum forward output (speed) of the associated IHT and drive wheel (e.g., wheel 106a). Similarly, each control lever 202 (e.g., lever 202a) may further be pivotable rearwardly to a third, maximum output (maximum reverse) position (e.g., abutting the rearward stop 206) as shown in FIG. 3C, corresponding to a maximum reverse output (speed) of the associated IHT and drive wheel (e.g., wheel 106a). In the illustrated embodiment, the neutral position of each control lever 202 may be located more closely to the rearward stop 206 to provide a greater range of lever movement for forward travel.

As one can appreciate, each control lever 202 may independently vary an output (e.g., velocity) of its respective drive wheel 106 proportionally between zero velocity (when in the neutral position) and the maximum forward speed (when in the maximum forward position). Each lever 202 may additionally vary proportionally reverse speed by moving incrementally from the neutral position to the maximum reverse position (abutting the stop 206), corresponding to the maximum reverse speed of its respective drive wheel.

As FIG. 1 illustrates, the control system 200 may also include various other operator controls. For instance, a parking brake handle 212 may selectively activate a brake when the vehicle is parked. A deck height adjustment lever 216 may also be provided to adjust the cutting height of the deck 114. Other controls, including for example, a throttle lever 218 to control the speed (or level of output) of the engine 104 and a deck engagement control 221 to initiate and terminate power delivery to the cutting blades of the mower deck 114, may also be provided.

Figure 4:
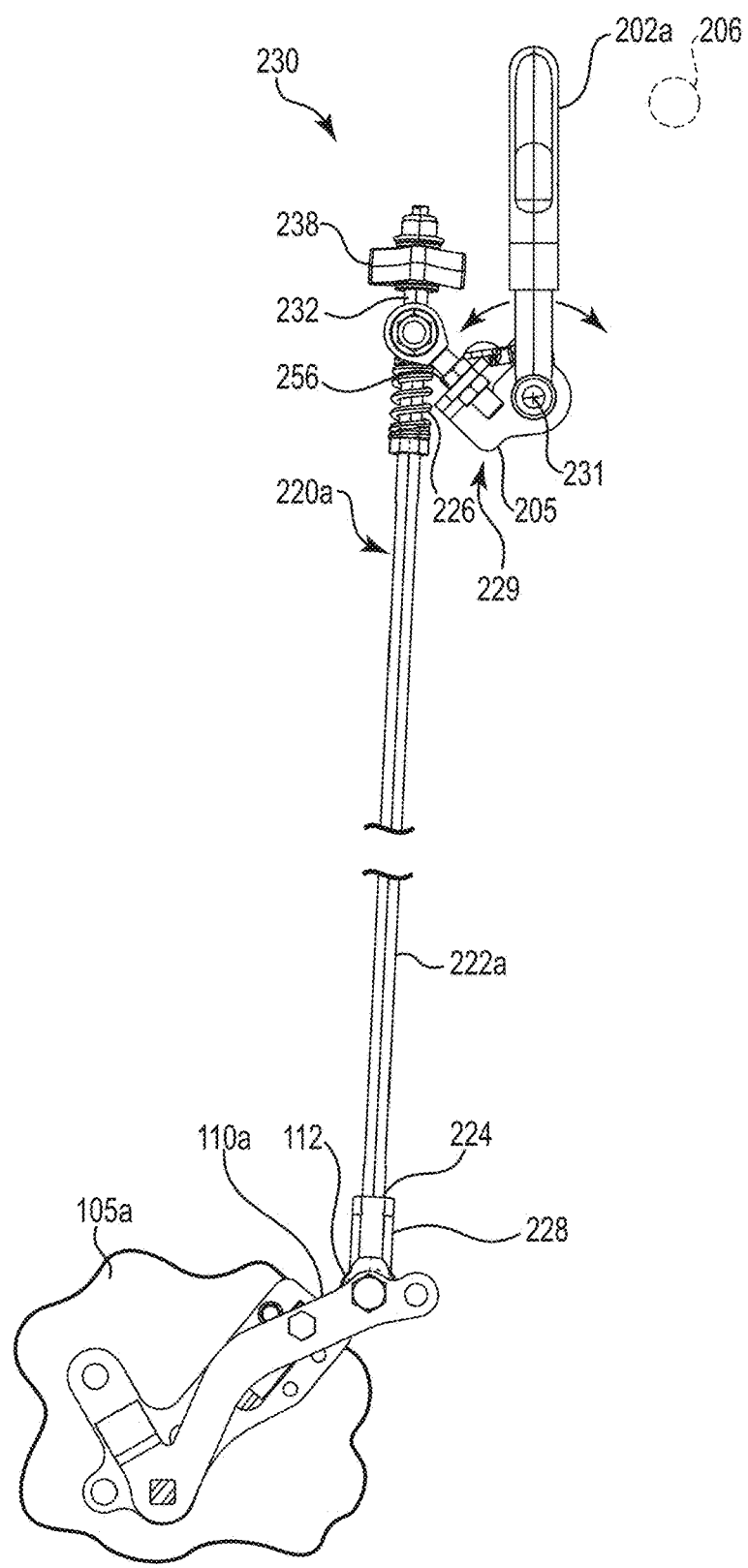
FIG. 4 is a side elevation view of the exemplary linkage and the linkage adjustment system of FIGS. 1 and 2.

FIG. 4 illustrates the left side control lever 202a, left side linkage system 220a, the exemplary linkage adjustment system 229, and the left side IHT 105a (the latter shown partially). Once again, while described and illustrated in the context of the left side of the mower 100, substantially similar components could be provided on the right side of the mower to address control of the right IHT 105b (see FIG. 2). As noted above, however, a right side linkage adjustment system is unnecessary and not provided in the illustrated embodiment as the ability to adjust only the left side linkage system is adequate to provide synchronization between the left and right drive systems.

In the illustrated embodiment, each control lever 202 is pivotally attached to the frame 102 (not shown in FIG. 4) such that it may pivot about the transverse, horizontal pivot axis 231. Each lever 202 may further include a grip portion 203 (see FIG. 5) to receive a hand of the operator, as well as a connecting portion 205. The connecting portion 205 may extend away from the pivot axis 231 such that pivotal movement of the lever 202 causes the connecting portion 205 to move through an arc of travel.

The linkage system 220a may include a link 222a having a first end 224 and a second end 226. The first end 224 may attach to or include a first connection mechanism 228 adapted to connect the first end 224 of the link 222 to the transmission, e.g., to a pivot arm 110a of the IHT 105a. In one embodiment, the first connection mechanism 228 is configured as a tubular sleeve pivotally attached to the pivot arm 110 at a pivot 112. The connection to the pivot arm 110 may be via a spherical rod end as is known in the art to permit out-of-plane linkage movement.

The tubular sleeve of the first connection mechanism 228 may include a threaded portion adapted to threadably connect with a corresponding thread formed on a body of the link 222. As a result, rotation of the link 222 (e.g., link 222a) may cause the link to be drawn into, or withdrawn from, the first connection mechanism. That is, rotation of the link relative to the first connection mechanism may cause an effective length of the link to shorten or lengthen.

The linkage adjustment system 229 may form a second connection mechanism 230 adapted to not only connect the second end 226 of the link 222a to the control lever 202 (e.g., lever 202a), but also to allow adjustment between components of the linkage system 220a. For example, the second connection mechanism 230 may include both a lever range setting arm 256 and a lever tracking adjustment device 257 (see FIG. 5) as further described below.

Figure 5:
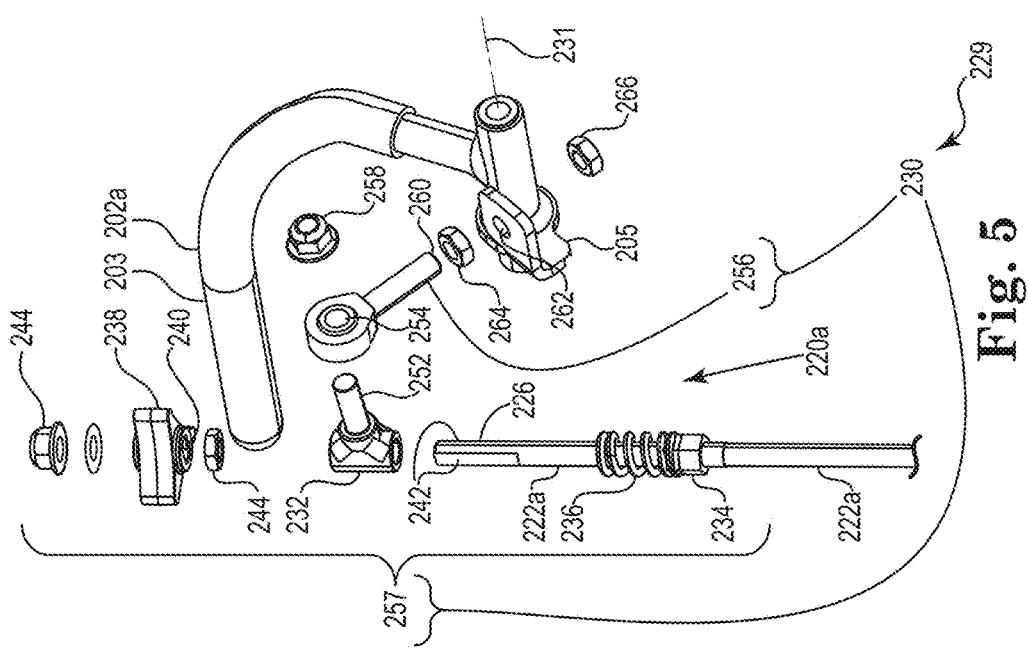
FIG. 5 is a partial exploded view of the linkage adjustment system of FIG. 4.

As shown in FIG. 5, the exemplary second connection mechanism 230 may include a sleeve or sleeve member 232. The sleeve member 232 may define a threaded aperture configured to receive threads (not shown) formed on the second end 226 of the link 222a (such threads being of opposite hand as compared to those threads formed on the opposite or first end of the link). The second end 226 of the link 222a may also threadably receive a jam nut 234. The jam nut 234 may support a compression spring 236 (or other biasing member) positioned between the jam nut and the sleeve member 232. The spring 236 may fit with clearance onto the second end 226 of the link 222a and, when the system is fully assembled, provide an upward biasing force to the sleeve member 232.

A rotatable member, e.g., knob 238, may be secured to the second end 226 of the link 222a such that it is near the sleeve member 232 as shown in FIG. 4. In one embodiment, the knob 238 may have an aperture 240 that is complimentary in shape to an outer surface of the second end 226 of the link 222. For example, the aperture 240 may be generally circular, but have one or more (e.g., two) flats formed therein adapted to engage corresponding flats 242 formed on an exterior surface of the second end 226. As a result, rotation of the knob 238 causes corresponding rotation of the link 222a.

While shown as utilizing corresponding flats formed in the aperture 240 of the knob 238 and on the exterior of the second end 226 of the link for engagement, such a configuration is not limiting. In fact, most any configuration that keys the knob to the link such that rotation of the knob causes rotation of the link is contemplated. For example, a set screw (not shown) may thread into the knob 238 and engage the second end 226. In another embodiment, the knob may fit with clearance over the second end 226, and then be retained to the second end with two jam nuts 244 as shown. Regardless of the method used to attach the knob to the link, the jam nut 234 may be positioned to ensure the spring 236 is adequately compressed between the nut 234 and the sleeve 232. Such compression may preload the linkage such that any backlash is reduced or eliminated from the system. Further, the preload provided by the spring 236 may provide resistance to rotation of the link 222a, e.g., resulting from vibration and the like.

The tracking adjustment device 257 (e.g., knob 238) may be coupled to the link 222a, and may effectively change the length of the link by changing the distance between the first connection mechanism 228 and the sleeve 232/second connection mechanism (this movement is attributable to the threaded engagement of: the first end 224 with the first connection mechanism 228; and the second end 226 with the sleeve 232). Stated another way, during manufacture of the mower 100, the length of the link 222a—i.e., the effective length between the attachment points formed by the first and second ends—may be effectively changed by adjusting (e.g., rotating) the knob 238 (see FIG. 4). Tightening of the knob 238 draws the first end 224 of the link 222a deeper into the first connection mechanism 228 and causes the sleeve 232 to move downwardly (relative to the link 222a), effectively shortening the length of the link 222a (i.e., shortening the distance between the pivot 112 and the sleeve member 232). Conversely, loosening the knob 238 permits the first end 224 to threadably back out of the first connection mechanism 228 and the sleeve member 232 to move upwardly (relative to the link 222a in FIG. 4), thereby effectively lengthening the link 222a (i.e., lengthening the distance between the pivot 112 and the sleeve member 232).

As shown in FIG. 5, the sleeve member 232 may further include a stub shaft 252 adapted to attach to a first end 254 of the range setting arm 256. Stated alternatively, the first end 254 of the range setting arm may operatively connect to the link 222a. In the illustrated embodiment, the first end 254 may form a spherical rod end (e.g., ball-and-socket receptacle) that receives therein the stub shaft 252 and is secured relative to the stub shaft with a nut 258.

A second or opposite end 260 of the range setting arm 256 may be connected to the control lever 202, e.g., to the connecting portion 205 of the lever 202a. In the illustrated embodiment, the end 260 of the range setting arm 256 forms a threaded shaft that fits, with clearance, into an aperture 262 formed on the connecting portion 205. Two jam nuts 264, 266 (e.g., locking members) may then be used to rigidly attach the second end 260 of the range setting arm to the lever 202a. As one of skill can appreciate, an effective length of the range setting arm 256 (i.e., a distance between the end 254/stub shaft 252 and the connecting portion 205) is adjustable (e.g., infinitely adjustable) by changing the position of the two jam nuts 264, 265 along the threaded portion of the end 260. In an alternative embodiment, the nuts 264, 266 could be replaced with a knob and spring arrangement (e.g., similar to the knob 238 and spring 236 described herein). The knob and spring could be attached to the end 260 of the range setting arm 256 generally where the nut 266 is shown (see, e.g., FIG. 5). The knob and spring could then effectively shorten and lengthen the range setting arm 256 in a manner similar to that described with respect to the knob 238 and spring 236.

During assembly of the mower 100, manufacturing variability and component tolerance may result in different output ranges for each IHT 105, e.g., the right IHT 105b (see FIG. 2), may generate rotational output corresponding to a maximum forward speed of its wheel 106b (when the lever 202b is in the full forward position as indicated in FIG. 3B)

of 10 miles/hour (mph) and a maximum reverse speed (when the lever 202b is in the full reverse position as indicated in FIG. 3C) of 4 mph. Thus, the IHT 105b/wheel 106b may have an output range of 14 mph. However, the left IHT 105a could generate a different output, e.g., a rotational output corresponding to a maximum forward speed of its wheel 106a (when the lever 202a is in the full forward position as indicated in FIG. 3B) of 7 mph and a maximum reverse speed (when the lever 202a is in the full reverse position as indicated in FIG. 3C) of 5 mph, yielding an output range of 12 mph.

To match the output range of the IHT 105a with that of the IHT 105b, the range setting arm 256 may be adjusted. As one can appreciate from a review of FIGS. 4 and 5, shortening or lengthening the range setting arm 256 effectively changes the length of the lever arm between the control lever 202a/pivot axis 231 and the link 222a/sleeve 232. By changing this length, the displacement of the link 222a may be altered for a given movement of the control lever 202a. For instance, in the example provided above, the range setting arm 256 may be lengthened by adjusting the location of the jam nuts 264, 266 until the range of the IHT 105a is 14 mph, matching that of the IHT 105b. As a result, after adjustment of the range setting arm 256, manipulation of the control lever 202a between the maximum forward position (see FIG. 3B) and the maximum reverse position (see FIG. 3C) should produce the same range in RPM of the IHT 105a (same range (14 mph) in speed of the wheel 106a) as provided by the IHT 105b.

While effective at matching output or speed ranges of the IHTs, the adjustable range setting arm 256 may detrimentally affect mower tracking. That is to say, after adjusting the range setting arm 256, when both levers 202 are then placed in the full forward (or full reverse) position, the mower may not travel in a straight line as expected. Rather, the IHT 105a may rotate the wheel 106a at one speed (e.g., forward at 8 mph) while the IHT 105b may rotate the wheel 106b at a second, different speed (e.g., forward at 10 mph). One of skill will realize that, in this instance, the IHT 105a/wheel 106a would rotate faster (e.g., 6 mph) compared to the IHT 105b/wheel 106b (e.g., rotating at 4 mph) when both control levers 202 are in the full reverse position as their respective ranges (14 mph) were already matched.

To address this issue, the tracking adjustment device 257 may be used. In general, the tracking adjustment device 257 (e.g., the knob 238) may alter a rotational position of the lever 202a for a given position of the link 222a. As a result, for example, turning the knob 238 may allow the IHT 105a/wheel 106a to have the same maximum output/speed as the IHT 105b/wheel 106b when both control levers 202 are in the full forward position, permitting the mower to track linearly when the control levers are held against the forward stop 204. Moreover, given that the range setting arm 256 has already been set as indicated above, the mower 100 should also track linearly in reverse when both control levers 202 are held against the rearward stop 206. In some embodiments, the potential output of the IHT 105a may be manufactured to be greater than that of the IHT 105b to ensure that a sufficient adjustment range is available for the IHT 105a.

Embodiments of the linkage adjustment system may thus permit leeway in manufacturing tolerances, while still ensuring linear tracking of the independent drive systems in maximum forward and reverse speeds. It is contemplated that once these adjustments are made during manufacture, further adjustment of the range setting arm should not be necessary. However, the knob 238 of the tracking adjuster may be conveniently located for access by the operator to provide additional adjustment between the left and right-side drive systems. For example, the operator may want to bias one drive system relative to the other (e.g., by rotating the knob 238) when operating the mower 100 transversely across a sloped surface. More specifically, the drive wheel at the lower elevation during hillside operation may be set to drive slightly faster to assist with maintaining linear tracking across the sloped surface.

As stated elsewhere herein, the linkage adjustment system 229 (e.g., the second connection mechanism 230 including the tracking adjustment device 257 and the range setting arm 256) may, in one embodiment, be absent from the right side linkage system 220b. Rather, the link 222b may be connected to the connecting portion 205 of the lever 202b without concern for adjustability provided with the range setting arm 256 and the tracking adjustment device 257 (of course, the link 222b may allow for some length adjustment during assembly). However, other embodiments may provide a linkage adjustment system similar to those described herein on both sides (e.g., on both the linkage system 220a and 220b).

While the linkage system 220 described above provides for real-time adjustment by the operator (e.g., tracking adjustment via the knob 238), such adjustment may be not always be necessary or even desired. FIGS. 6-9 and 12 illustrate a linkage system 320 (e.g., left side system 320a) having a linkage adjustment system 329 in accordance with another embodiment of this disclosure. The linkage system 320a and linkage adjustment system 329 may be similar in many respects to the respective systems 220 and 229 already described above. For example there may be left and right-side linkages each including a link 322 having a central body, a first end 324, and a second end 326. The first end 324 may attach to or include a first connection mechanism 328 (e.g., spherical rod end 327) adapted to connect the first end of the link 322 (e.g., link 322a) to the transmission, e.g., to the pivot arm 110 of the respective IHT 105 (e.g., IHT 105a). Once again, the spherical rod end 327 may pivotally connect to the pivot arm 110a of the IHT 105a such that the two components may pivot relative to one another about a pivot axis 333. In some embodiments, the first connection mechanism 328 may connect to the arm 110 of the IHT 105 at one of two or more locations that are each at different radial distances from the input shaft 111 of the IHT. As a result, the linkage system/IHT may be set for different maximum speeds depending on end user preferences.

Figure 6:
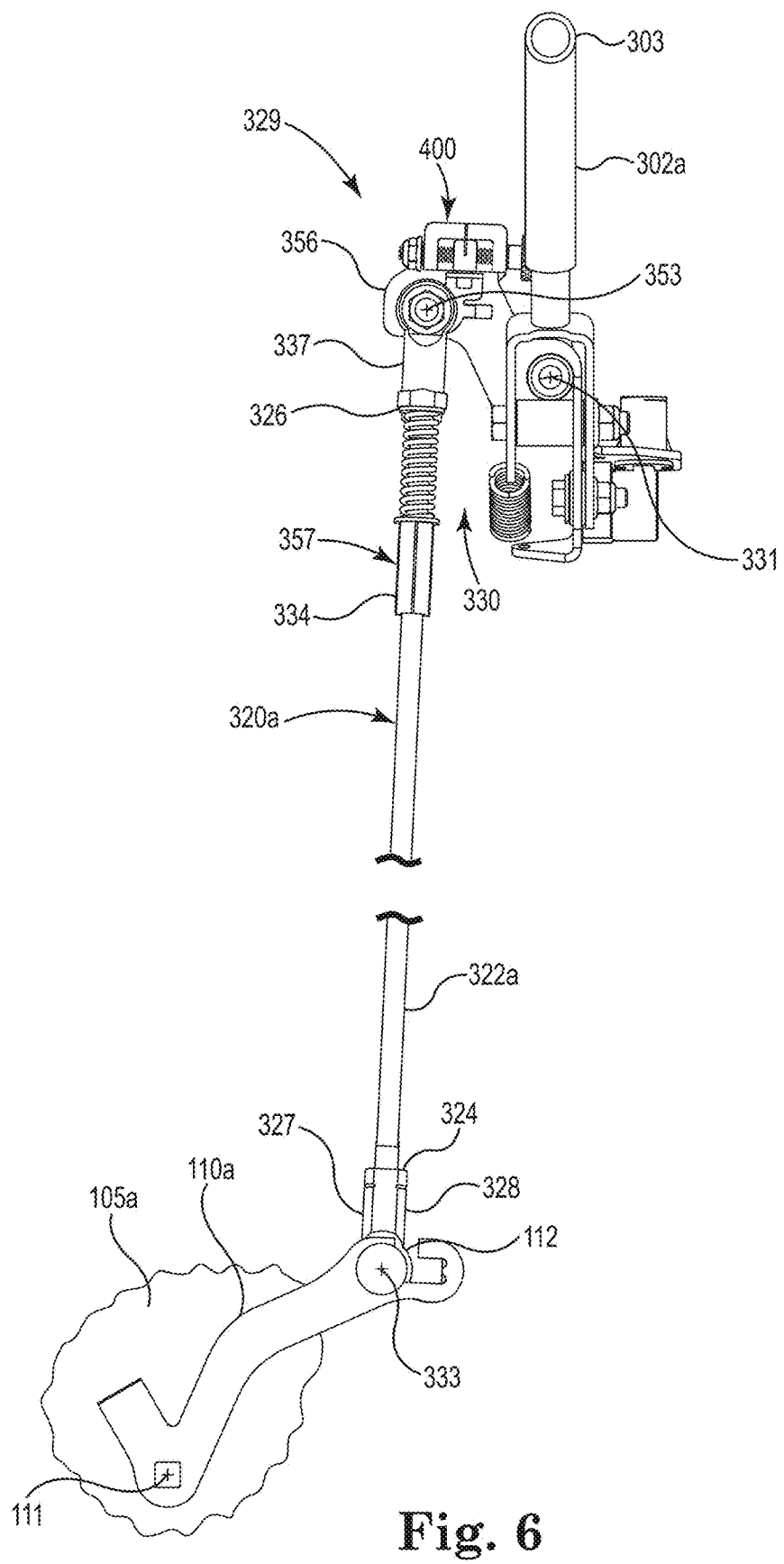
FIG. 6 is a side elevation view of an exemplary linkage and linkage adjustment system in accordance with another embodiment of the disclosure, the system shown with a range setting tool attached.

FIG. 6 illustrates the left side control lever 302a, left side linkage system 320a incorporating an exemplary linkage adjustment system 329, and the left side IHT 105a (the latter shown partially). Once again, while described and illustrated in the context of left side drive system components of the mower 100, substantially similar components may be provided on the right side of the mower to address control of the right IHT 105b (see FIG. 2). As noted above, however, a right side linkage adjustment system (like that described below with respect to the left side linkage system 320a) may be unnecessary.

The control lever 302a (as well as the opposite lever 302b) may again be pivotally attached to the frame 102 (frame not shown in FIG. 6) such that it may pivot about a transverse, horizontal lever pivot axis 331. Each lever 302 may further include a grip portion 303 (see also FIG. 7) to receive a hand of the operator, as well as a connecting portion 305. The connecting portion 305 may extend away from the pivot axis 331 such that pivotal movement of the lever 302 causes the connecting portion 305 to move through an arc of travel. While shown as a separate component, the connecting portion 305 may be integrally formed with the grip portion.

The first connection mechanism 328 (see FIG. 6) may be constructed in a manner similar to the mechanism 228 already described above. For instance, it may include the spherical rod end 327 having a threaded sleeve, wherein the sleeve engages a thread formed on the end of a body of the link 322. As a result, rotation of the link 322 (e.g., of the link body) may cause the link to be drawn into, or withdrawn from, the first connection mechanism. Stated alternatively, rotation of the link 322 relative to the first connection mechanism may cause an effective length of the link 322 to shorten or lengthen.

Like the linkage system 220a, the linkage system 320a may also include a second connection mechanism 330 adapted to not only connect the second end 326 of the link 322a to the control lever 302 (e.g., lever 302a), but also to allow some adjustment between components of the linkage system 320a. For example, the second connection mechanism 330 may include a lever range setting arm 356 as further described below. Tracking adjustment may also be provided via a link or tracking adjustment device 357, which, in one embodiment, takes the form of a rotatable member or sleeve nut 334 (also further described below) coupled to the link 322a.

Figure 7:
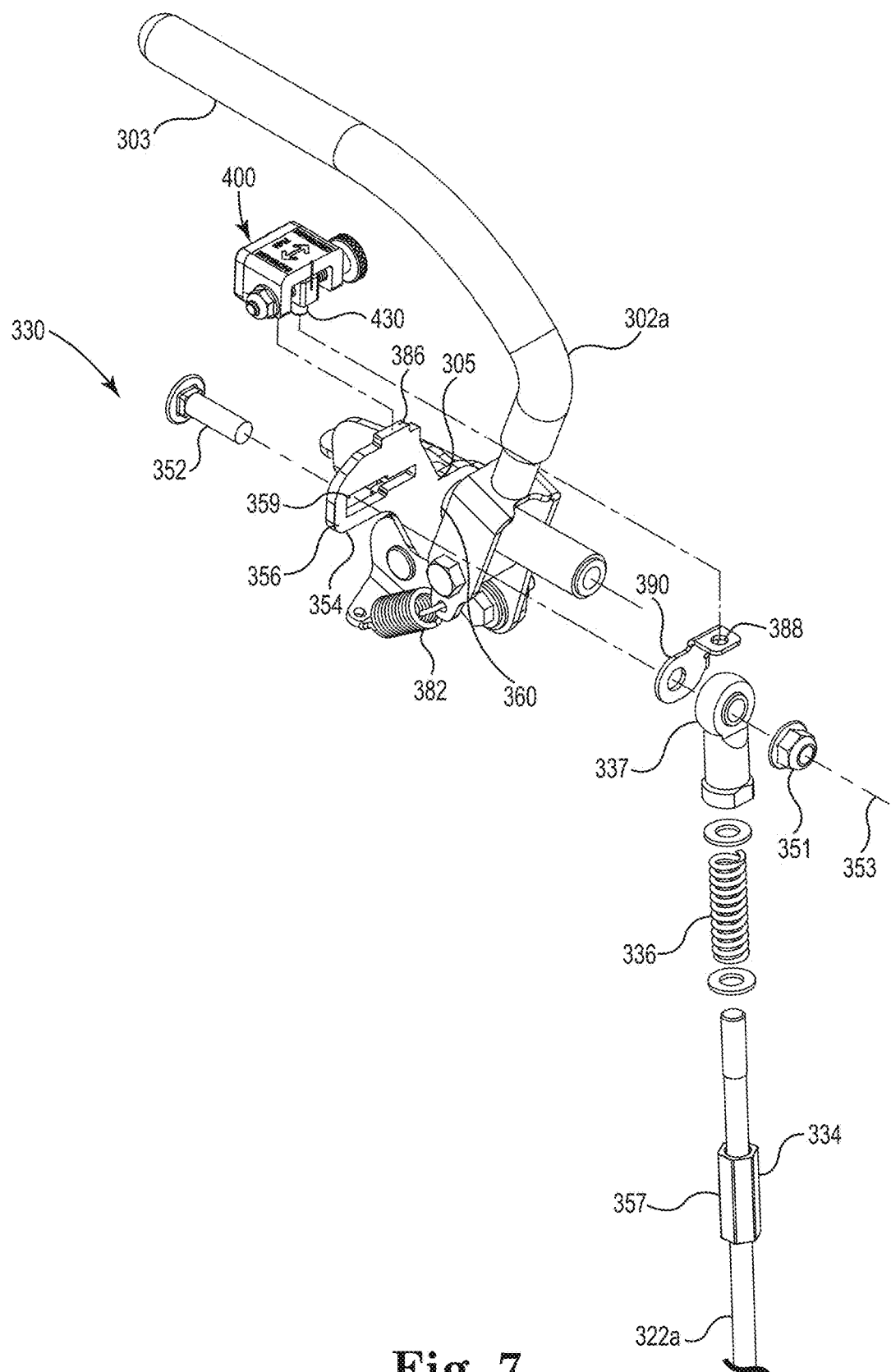
FIG. 7 is a partial exploded view of the linkage adjustment system of FIG. 6.

As with the tracking adjustment device 257, the tracking adjustment device 357 may selectively adjust an effective length of the link 322a. However, unlike the device 257, the tracking adjustment device 357 illustrated in FIGS. 6-7 is not intended for real-time, end-user adjustment. Rather, it is configured to be set at the time of manufacture and at periodic maintenance intervals thereafter. In the embodiment illustrated in FIGS. 6-7, the tracking adjustment device 357 simply includes opposite-handed threads at each end of the body of the link 322a (e.g., left-handed thread at the first end 324 and right-handed thread at the second end 326), as well as the sleeve nut 334 that is fixed, e.g., welded, to the link body. The sleeve nut 334 may form a collar that compresses a spring 336 against a spherical rod end 337 that forms (or is otherwise attached to) the second end of the link 322a. The spherical rod end 337 may be connected and secured to the range setting arm 356 via a locking member (e.g., a threaded pin 352/nut 351) that engages the second end of the link, such that the link 322a may pivot, relative to the range setting arm 356, about a pivot axis 353 that is parallel to both the pivot axis 331 and the pivot axis 333 (see FIG. 6).

To adjust tracking of the mower 100 (e.g., to ensure that both IHTs 105 drive at the same speed when the control levers 302 are in the maximum forward position), the link 322a may be rotated (e.g., gripped with a wrench via flats formed on the sleeve nut 334). As the body of the link 322a rotates relative to the rod ends 327 and 337, the opposite-handed threads at each end result in the effective length of the link 322a (e.g., distance between the pivot axes 353 and 333) becoming longer or shorter. Accordingly, during manufacture of the mower 100, the length of the link 322a may be effectively changed merely by rotating the link itself. To minimize unintended rotation (e.g., loosening) of the link 322a during mower operation, the spring 336 may bias the body of the link 322a away from the second connection mechanism 337.

Figure 8:
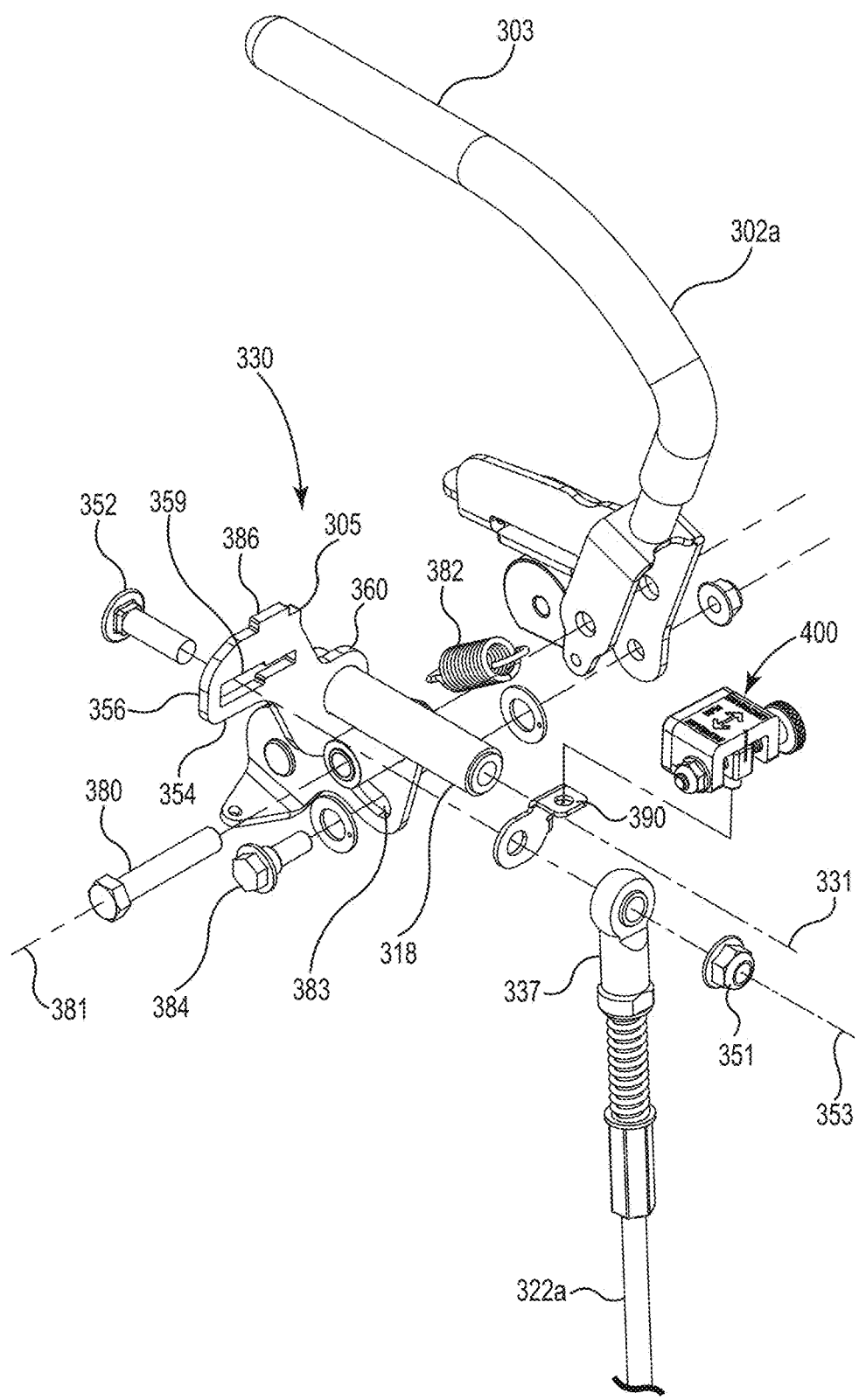
FIG. 8 is another partial exploded view of the linkage adjustment system of FIG. 6.

FIGS. 7 and 8 illustrate different exploded perspective views of the second connection mechanism 330, link 322a, and control lever 302a. As shown in these views, the second connection mechanism 330 may, in addition to the spherical rod end 337, also include the range setting arm 356, which may include a first end or portion 354 (effectively connected to the link 322a (e.g., to the rod end 337 of the second end of the link)) via the pin 352/nut 351, and a second end or portion 360 (effectively connected to the control lever 302). In the illustrated embodiment, the first portion 354 may define a slot 359, the purpose of which is described below.

As perhaps more clearly shown in FIG. 8, the second portion 360 of the range setting arm 356 may be integrally formed with a pivot body 318 to which the control lever 302 is attached. Accordingly, the range setting arm 356 may actually form at least part of the connecting portion 305.

In the illustrated embodiments, the control lever 302a may pivotally attach to the pivot body 318 via a fastener or pin 380 such that it may pivot about an axis 381 that may, as shown in FIG. 8, be generally perpendicular to the pivot axis 331 (e.g., it may extend parallel to the longitudinal axis of the mower 100). A spring 382 may be provided to bias the control lever 302a outwardly. In order to operate the drive system, the lever 302a may be pivoted, against the biasing force of the spring 382, to its operating position as shown in FIG. 7. Such movement of the control lever 302a may engage an OPC sensor (not shown), allowing the drive system to be engaged (in forward or reverse as already described herein). The pivot body 318 may include an arc-shaped slot 383 (engaged with clearance by a fastener 384 connected to the control lever 302a) to limit the angular range of the control lever 302a about the axis 381.

As the control lever 302, and thus the pivot body 318, pivot about the axis 331, the range setting arm 356 may move through an arc of travel. As one of skill can appreciate, the movement imparted to the link 322a by movement of the control lever 302a may be influenced by the distance between the pivot axis 331 and the pivot axis 353 of the spherical rod end 337. That is to say, like the adjustment system 229 described above, the range setting arm 356 may be used to adjust the location of the link 322a relative to the control lever 302a, thereby allowing adjustment of the effective range of the IHT 105a.

To provide such range adjustment, the range setting arm 356 may accommodate movement of the pin 352/spherical rod end 337 along the slot 359. The slot 359 is, in some embodiments, adapted to secure the second end of the link 322a (e.g., via receiving the second end of the link via the pin 352/nut 351) at one of three or more locations each spaced differently (e.g., each being at a different distance) from the pivot axis 331. In some embodiments, the three or more locations may be five or more locations, ten or more locations, or 20 or more locations. In other embodiments, the three or more locations may actually be an infinite number of locations contained within a predetermined range defined by a length of the slot 359 (i.e., the slot may provide continuous adjustability over its range). As further described below, the locking member (e.g., pin 352/nut 351) may both engage the second end of the link and be received within the slot 359, whereby the locking member secures the link 322a, relative to the arm, at any one of the available locations within the slot.

Figure 9:
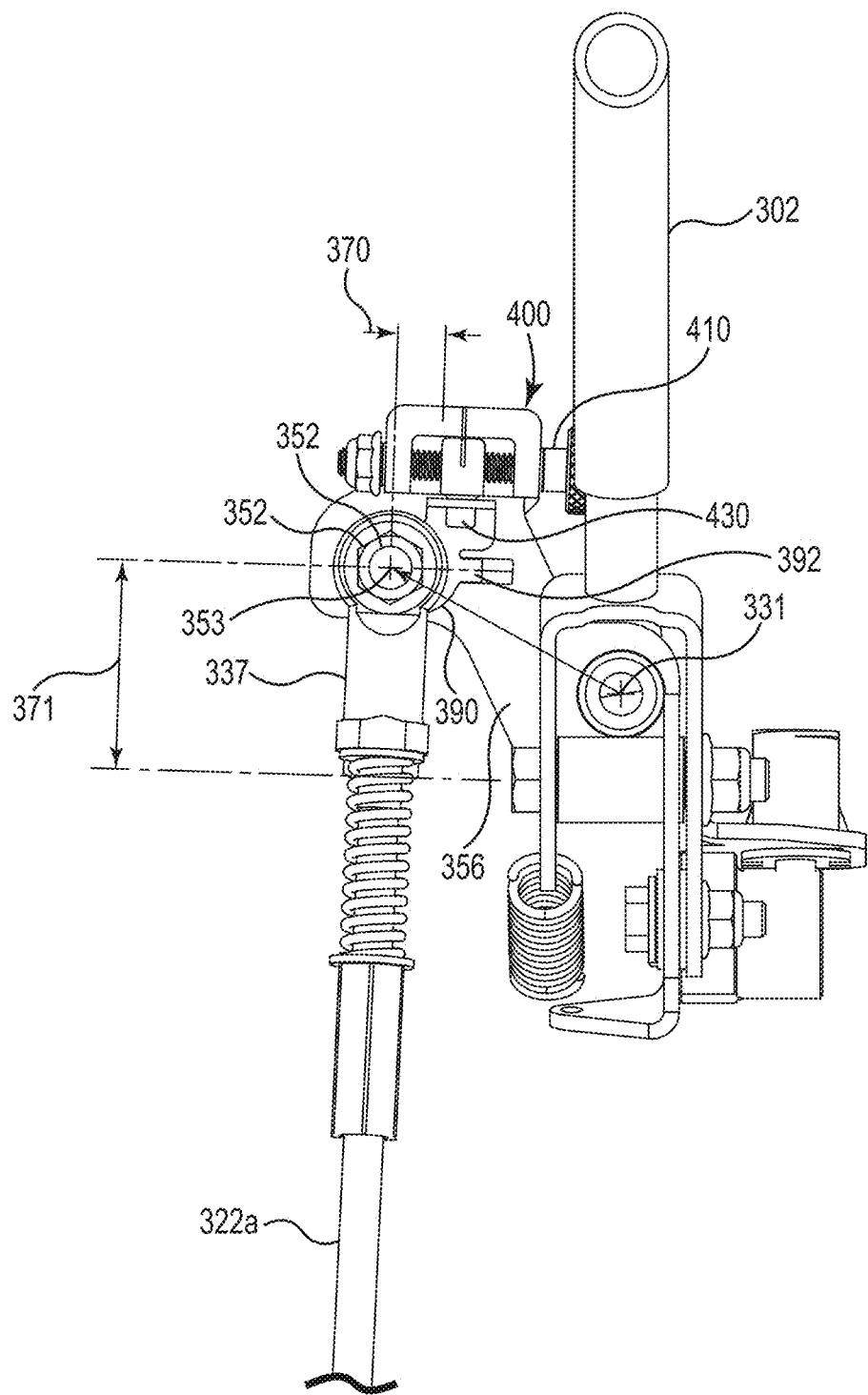
FIG. 9 is a partial side elevation view of the linkage adjustment system of FIG. 6.

FIG. 9 illustrates an exemplary embodiment wherein the slot 359 (see FIG. 8) accommodates translation of the pin 352 over a predetermined range 370 that may, in one embodiment, be about 0.75 to about 1 inch (e.g., about 0.89 inches). The slot may be inclined at a slight angle 371, relative to horizontal, of 1 to 5 degrees (e.g., 2 degrees). The angle 371 of the slot 359 may be an approximation of an arc formed by movement of the axis 353 of spherical rod end 337 as the link 322a pivots about the pivot axis 333 (see FIG. 6). By providing this matched angle, movement of the spherical rod end 337 (as described in more detail below) along the slot 359 can occur without affecting the actual position of the control lever 302a. As a result, subsequent adjustments to the length of the link 322a are not required as a result of movement of the axis 353 along the slot 359.

As the distance between the pin 352 (e.g., the axis 353) and the pivot axis 331 changes depending on the pin's position within the slot 359, the range setting arm may allow a range of the link's output to be varied (for a given input to the control lever), thereby permitting calibration of the left side drive system to the right side as already described above.

Figure 10:
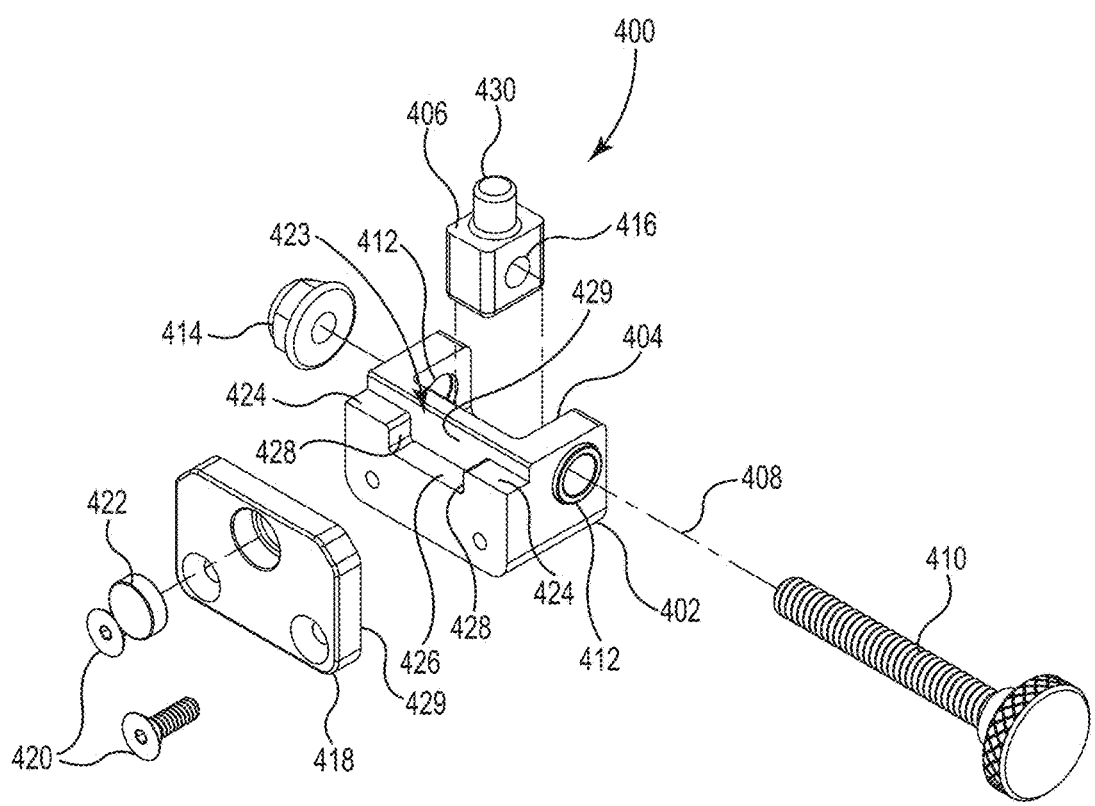
FIG. 10 is an exploded view of a range setting tool in accordance with one embodiment of the disclosure.

While the range setting arm 356 is effective at altering the IHT output range, those of skill in the art will understand that finding the proper location of the pin 352 within the slot 359, and securing the pin at that location, could potentially be a tedious process. To address this problem, an adjustment tool 400 was developed, an embodiment of which is further described below and illustrated in detail in FIG. 10. As shown in this view, the tool 400 may include a body 402 (e.g., a stationary portion) defining a cavity 404 adapted to receive therein an alignment guide 406. The cavity 404 is of sufficient size to permit the alignment guide 406 (e.g., a moving portion) to translate back-and-forth therein along an axis 408 of a drive screw 410. The drive screw 410 may pass with clearance through bushings 412 in the body 402 and be retained in place with a nut 414. The drive screw 410 may also threadably engage a threaded passage 416 formed in the alignment guide 406 such that rotation of the drive screw 410 results in translation of the alignment guide along the axis 408 and within the cavity 404. As described in more detail below, when the adjustment tool 400 is selectively attached to both the link 322a and the control lever/arm 356, the tool may assist with positioning the pin 352/link 322a (along the slot 359) relative to the pivot axis 331.

A cap 418 may be attached to one side of the body 402, e.g., with fasteners 420. In one embodiment, the cap may include a magnet 422 that is secured, e.g., glued, press-fit, etc., into the cap for reasons further described below. With the cap 418 secured to the body 402, the tool 400 defines a recess, e.g., stepped recess 423, defined by surfaces 424, 426, 428, and 429 of the body 402/cap 418.

With reference now to FIGS. 7 and 9, the adjustment tool 400 may, during manufacture be attached to the range setting arm 356. In one embodiment, the stepped recess 423 of the adjustment tool 400 may correspond generally to a shape of a corresponding tab 386 formed on the range setting arm 356. That is to say, the tab 386 (see FIG. 7) and other upper surfaces of the range setting arm may be received within the stepped recess 423, wherein the tool is constrained relative to the range setting arm by contact of the tab 386/arm 356 surfaces with corresponding surfaces 424, 426, 428, and 429 (see FIG. 10) of the tool. To further ensure that the tool 400 remains in place, the magnet 422 may magnetically couple to the range setting arm when the tool is in the desired position (see FIG. 9).

The alignment guide 406 of the tool 400 may include a protrusion or index member 430 (see also FIG. 10) that is configured to be received within or otherwise engage a receiving aperture 388 of a sheet metal bracket 390 as shown in FIG. 7. In some embodiments, the bracket 390 is mounted to the spherical rod end 337 (e.g., second end of the link 322a) by the pin 352. The bracket 390 may include a tab 392 that engages a portion of the slot 359 (see FIG. 9). This engagement may ensure that the aperture 388 remains engaged with the index member 430 during operation of the tool 400.

Figure 11:
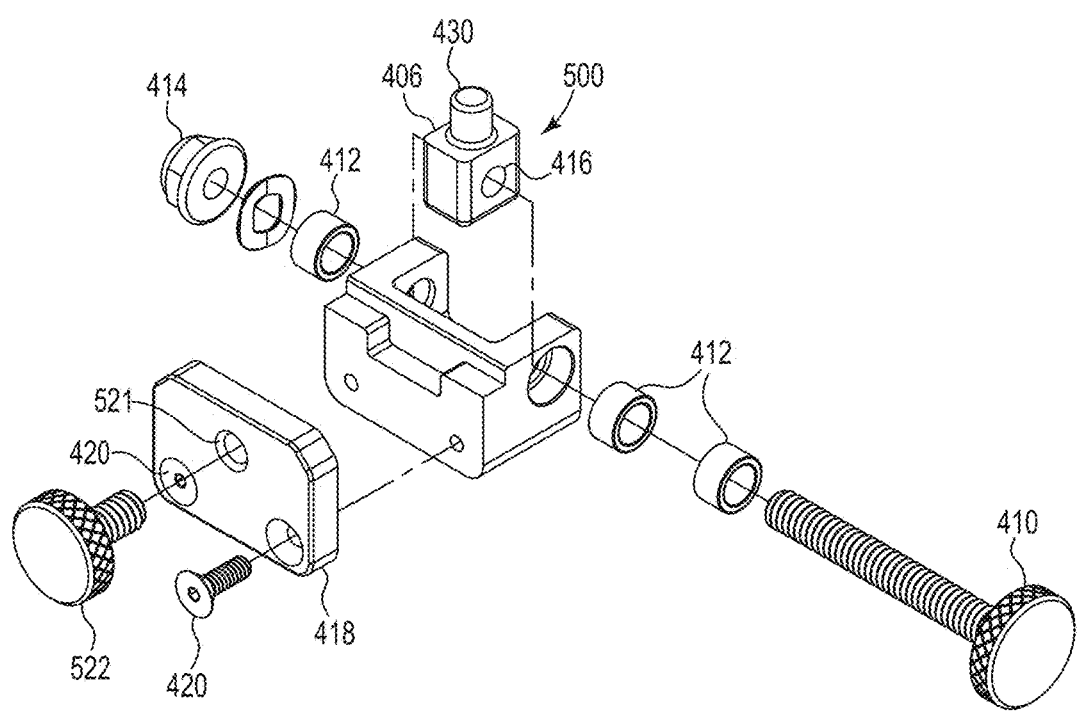
FIG. 11 is an exploded view of a range setting tool in accordance with another embodiment of the disclosure.
Figure 12:
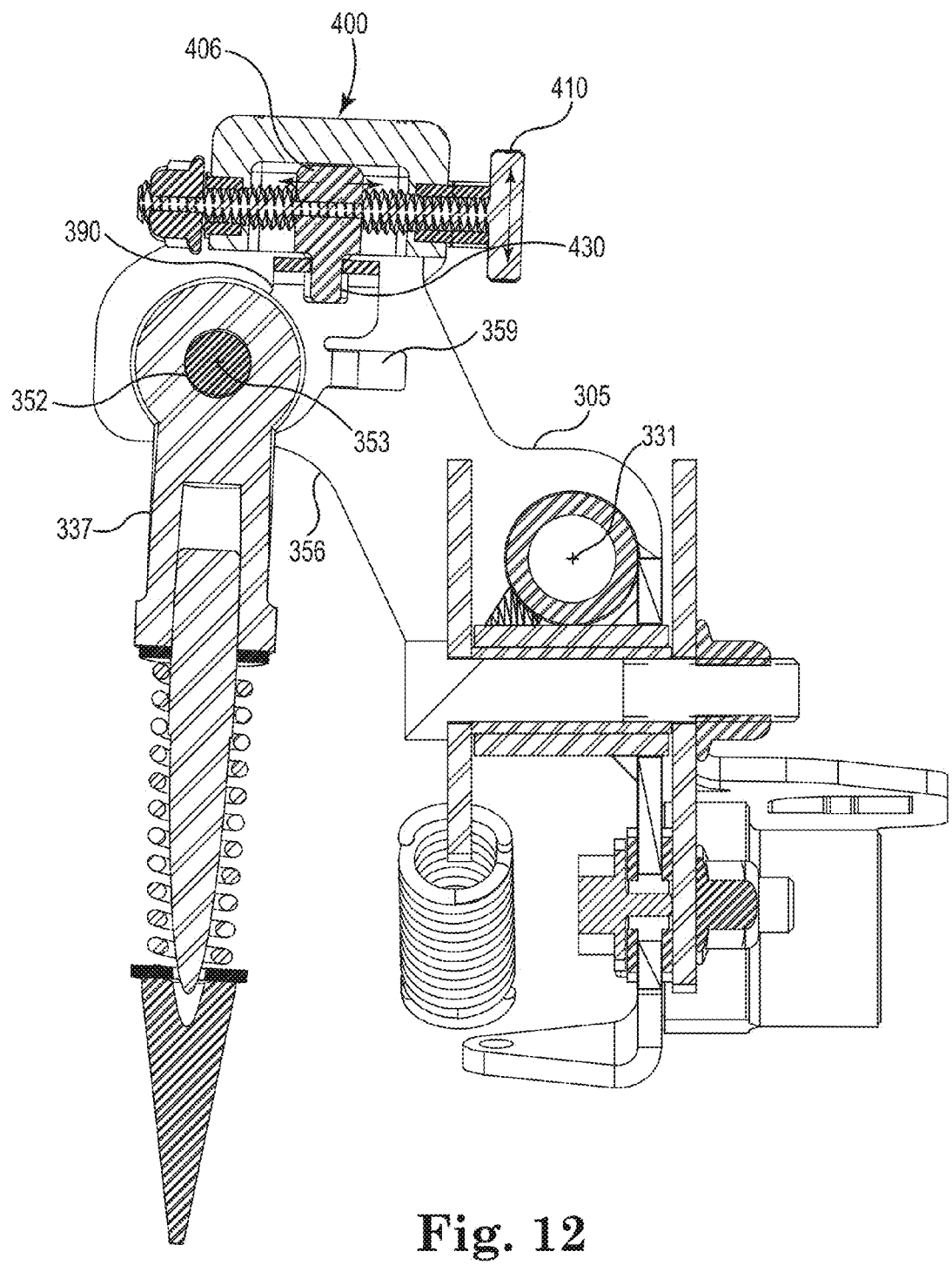
FIG. 12 is a view similar to FIG. 9, but showing the linkage adjustment system in section to better illustrate operation of the range setting tool.

FIG. 11 illustrates a tool 500 in accordance with another embodiment of the disclosure. The tool 500 is generally identical to the tool 400 with the exception that the magnet 422 is replaced with a fastener, e.g., set screw 522, that mechanically attaches or otherwise engages the tab 386 and/or the range setting arm. For example, the set screw 522 may threadably engage a threaded hole 521 passing completely through the cap 418 such that the set screw 522 can be selectively tightened against the tab 386 to attach the tool 500 in place with the range setting arm.

As discussed above, during assembly of the mower 100, manufacturing variability and component tolerance may result in different output ranges for each IHT 105, e.g., the right IHT 105b may have an output range different that an output range of the IHT 105a. To match the output range of the IHT 105a with that of the IHT 105b, the range setting arm 356 and the tool 400 may be utilized (while described below in reference to the tool 400, the description applies equally to the tool 500). As an initial matter, the adjustment tool 400 may be placed upon the range setting arm 356 as shown in FIG. 9, and the pin 352 and nut 351 may be loosened. With the range of the right IHT 105b (the speed of the IHT 105b when the control lever 302b is in the maximum forward position plus the speed when the control lever is in the maximum reverse position) known, (e.g., +10 mph to −4 mph), the output range of the left IHT 105a can be measured. The adjustment tool can then be manipulated to precisely dial the position of the second end of the link (e.g., the spherical rod end 337) relative to the range setting arm 356 by manually turning the drive screw 410 (the screw may include a knurled knob to accommodate turning). As the drive screw is turned, the moving portion (e.g., alignment guide 406) may incrementally translate along the slot 359 while the stationary portion remains fixed to the arm 356. Due to the engagement of the index member 430 with the aperture 388, the second end 326 of the link (and thus the pin 352/nut 351) may be moved along the slot 359 of the arm 356 in proportion to the number of rotations of the drive screw as shown in the partial section view of FIG. 12. Such movement effectively changes the distance between the second end of the link 322a/pivot axis 353) and the pivot axis 331. As a result, fine adjustment of the output range of the left side linkage system may be achieved. Once the range is equivalent to the range of the right side drive system, the pin 352 and nut 351 may be tightened and the adjustment tool 400 removed (tracking adjustment may be accommodated as already described by turning the sleeve nut 334).

While subsequent adjustment of the position of pivot axis 353 relative to pivot axis 331 is generally not required, the tool could be, in some embodiments, included with the mower 100 so that the operator may make adjustments when needed.

While illustrated as distinct embodiments herein, those of skill in the art will recognize that aspects of one of the described embodiments may be combined with aspects of other described embodiments of this disclosure. For example, the tracking adjustment device 257 (e.g., knob 238) of FIG. 5 could be combined with the range setting concepts described in FIGS. 6-9 and 12 to produce yet other embodiments without departing from the scope of this disclosure.

While described herein in the context of a drive wheel control system for a ZTR grounds maintenance vehicle, those of skill in the art will appreciate that linkage adjustment systems similar to those described and/or illustrated herein may find application to most any linkage system needing to synchronize two or more outputs (e.g., drive systems), or even to singular linkage systems merely needing adjustment. Moreover, while shown and described as including system tracking and range adjustment at one end of the linkage (e.g., at the control lever end), other embodiments may locate one or both of these aspects at the opposite (e.g., at the transmission) end of the linkage where such a configuration would be advantageous.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A linkage adjustment system, comprising:
   a link comprising a first end and a second end;
   a transmission attached to a frame;
   a control lever pivotally attached to the frame and pivotable about a lever pivot axis;
   a first connection mechanism connecting the first end of the link to the transmission;
   a second connection mechanism connecting the second end of the link to the control lever, wherein the second connection mechanism comprises a range setting arm comprising a first portion connected to the second end of the link, and a second portion connected to the control lever;
   a locking member that engages the second end of the link and secures the second end of the link to the range setting arm at any one of a plurality of locations that are each at a different distance from the lever pivot axis; and
   an adjustment tool comprising a stationary portion that selectively mounts to either the second end of the link or the range setting arm, and a moving portion that selectively engages the other of the second end of the link or the range setting arm, wherein manipulation of the adjustment tool incrementally displaces the second end of the link relative to the range setting arm, effectively changing the distance between the second end of the link and the lever pivot axis.

2. The system of claim 1, wherein the adjustment tool includes a fastener adapted to attach the tool to either the second end of the link or the range setting arm.

3. The system of claim 1, wherein the second end of the link comprises a bracket defining an aperture, the aperture sized to receive therein a protrusion formed on the moving portion of the adjustment tool.

4. The system of claim 1, wherein the adjustment tool defines a recess sized to receive therein a tab formed on the range setting arm.

5. The system of claim 1, wherein the range setting arm defines a slot adapted to receive the locking member, wherein a position of the locking member within the slot may be adjusted under control of the adjustment tool.

6. The system of claim 1, wherein the link further comprises a tracking adjustment device.

7. The system of claim 6, wherein the tracking adjustment device comprises a rotatable member secured to the link, wherein rotation of the rotatable member changes a distance between the first and second connection mechanisms.

8. The system of claim 6, wherein a maximum forward output of the transmission is adjusted by rotation of the tracking adjustment device.

9. The system of claim 1, wherein an output range of the transmission may be adjusted by moving the second end of the link to a different location selected from the plurality of locations.

10. A method for adjusting an output range of a linkage system, the method comprising:
    attaching a first end of a link to a transmission, and attaching a second end of the link to an arm connected to a control lever, wherein the control lever displaces the link as the control lever and the arm pivot together about a lever pivot axis;
    adjusting a length of the link to set a maximum forward output of the transmission;
    attaching an adjustment tool to the arm and to the second end of the link, wherein the adjustment tool has a stationary portion and a moving portion;
    moving the moving portion relative to the stationary portion, thereby displacing the second end of the link relative to the lever pivot axis;
    securing the second end of the link relative to the arm; and
    removing the adjustment tool from the arm and the second end of the link.

11. The method of claim 10, wherein attaching the adjustment tool to the arm comprises mechanically attaching the adjustment tool to the arm.

12. The method of claim 10, wherein displacing the second end of the link relative to the lever pivot axis comprises moving the second end of the link along a slot formed in the arm.

* * * * *